Oct. 11, 1927.

M. M. TITTERINGTON

STABILIZER

Filed April 28, 1923

INVENTOR
Morris M. Titterington

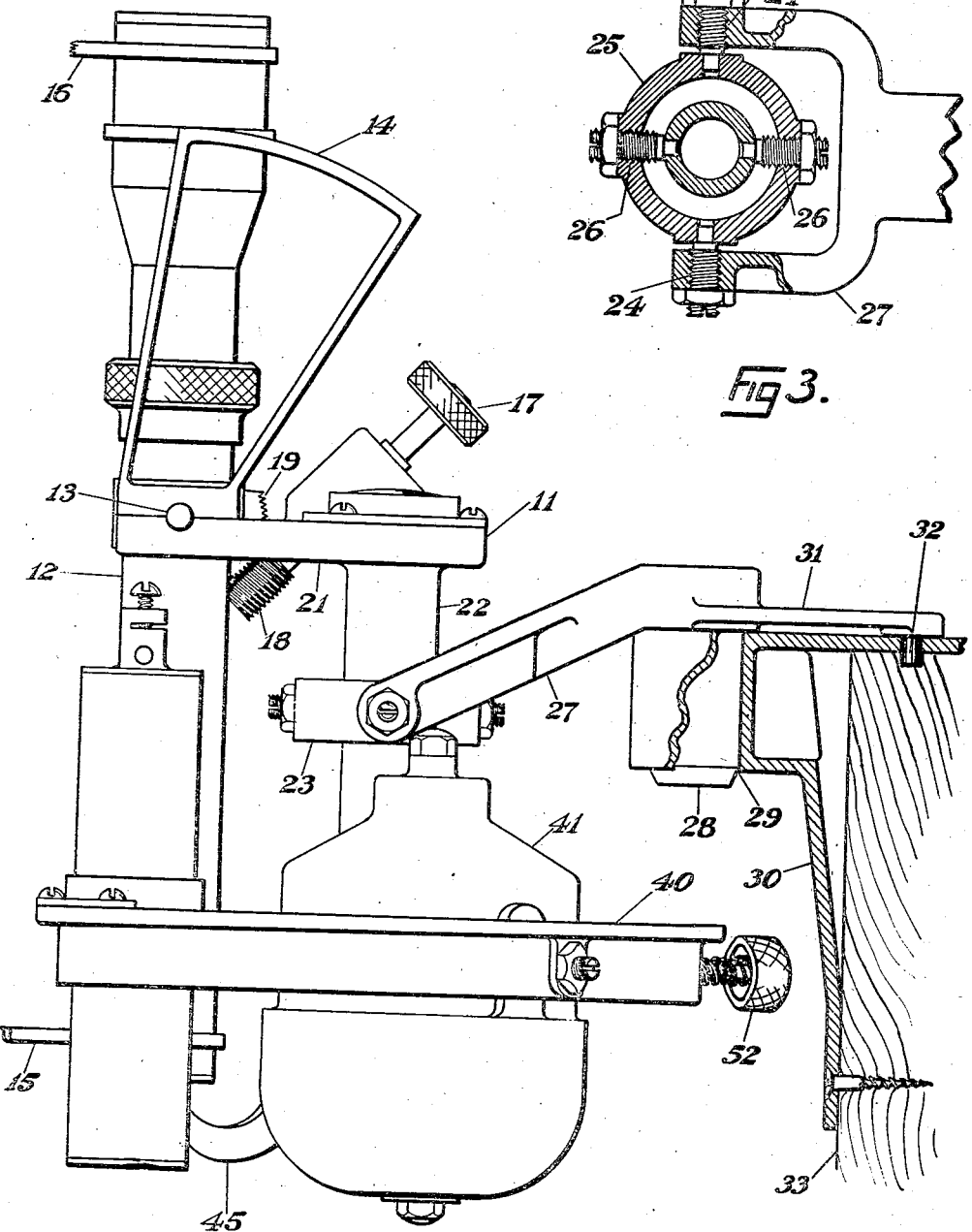

Oct. 11, 1927.

M. M. TITTERINGTON

STABILIZER

Filed April 28, 1923    4 Sheets-Sheet 3

1,645,079

INVENTOR
Morris M. Titterington

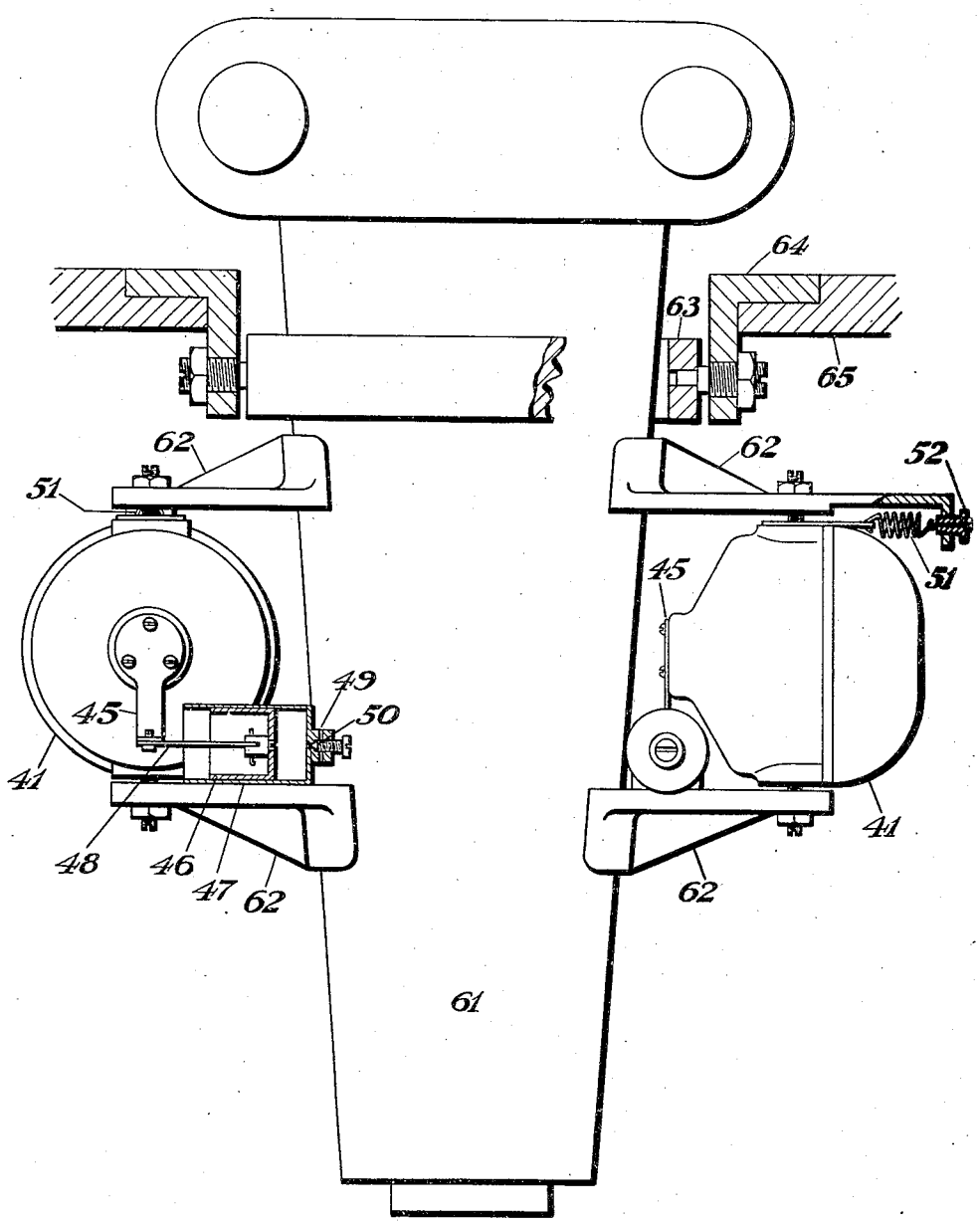

Patented Oct. 11, 1927.

1,645,079

UNITED STATES PATENT OFFICE.

MORRIS M. TITTERINGTON, OF BROOKLYN, NEW YORK, ASSIGNOR, BY DIRECT AND MESNE ASSIGNMENTS, TO CHARLES H. COLVIN AND MORRIS M. TITTERINGTON, OF BROOKLYN, NEW YORK.

STABILIZER.

Application filed April 28, 1923. Serial No. 635,406.

My invention relates to gyroscopic stabilizers, and more particularly to stabilizers for bomb-sights, cameras, etc., for use on aircraft.

An object of my invention is to provide a means of holding a bomb-sight or camera or other piece of apparatus steady, so that it is undisturbed by the action of upsetting forces normally encountered in aircraft or other dirigible vehicles. A further object is to effect this stability with a simple gyroscopic mechanism which is easily adaptable to the steadying of various types of apparatus. Other objects and advantages will appear as my invention is disclosed and described.

In the accompanying drawings I show preferred forms of my invention, as applied to the stabilizing of a bomb-sight and of a camera. As will be apparent from the description to follow, the invention is equally applicable to the stabilizing of other pieces of apparatus and I claim protection as to all such applications of this invention as may obviously be made.

Referring to the drawings:

Figure 2 is a side view of the stabilizer and of a bomb-sight to be stabilized. The mounting bracket is shown partly in section.

Figure 3 is a fragmentary top view of the gimbal joint, partly in section.

Figure 6 is an elevation, partly in section of a stabilizer applied to a camera.

Figure 1:
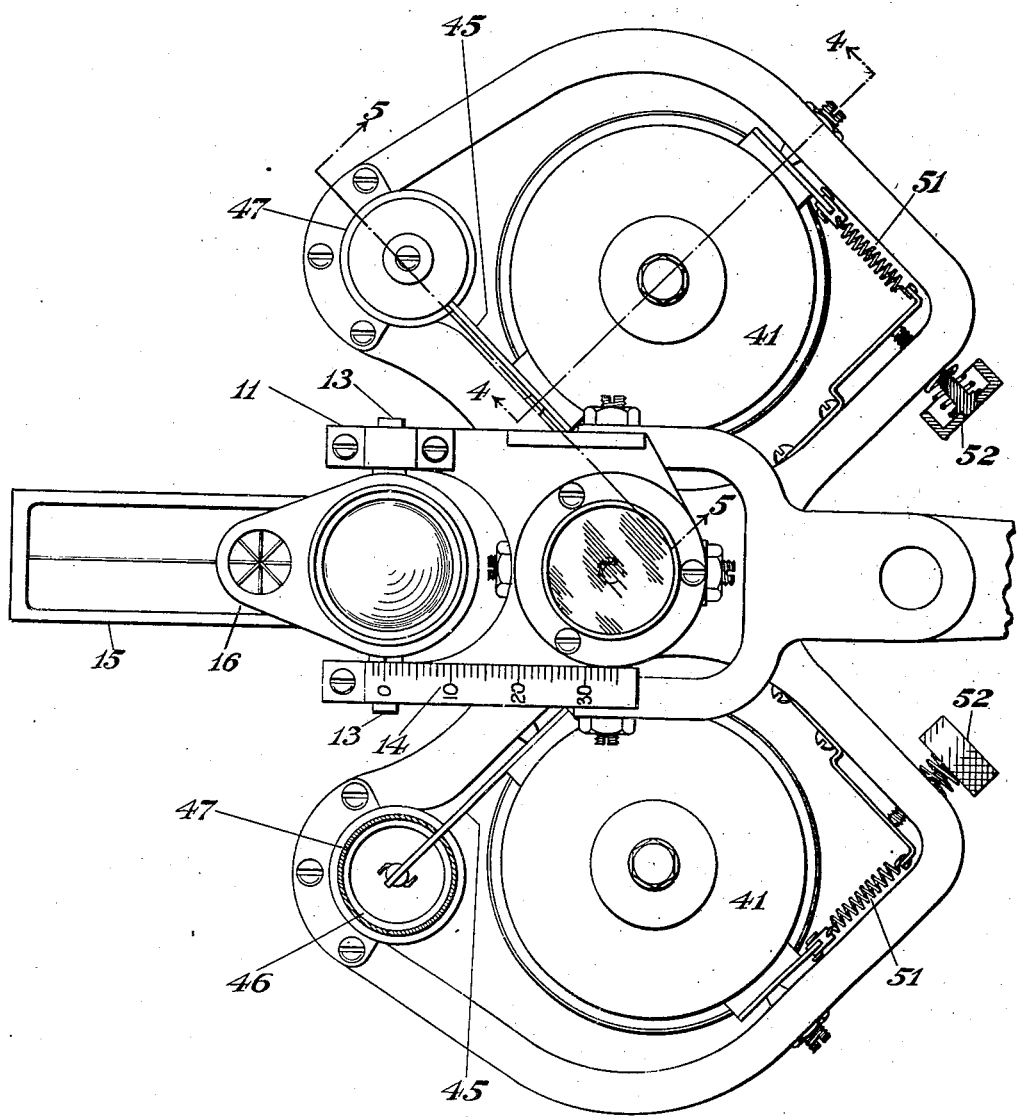
Figure 1 is a top view of the stabilizer and of a bomb-sight to be stabilized. One of the dash-pots is shown partially in section.

Referring particularly to Figures 1 to 5 inclusive, the object to be stabilized is the bomb-sight 11. This comprises a sight-tube 12 which is pivotally mounted at its center of gravity in the trunnions 13, and whose angle with the vertical is indicated upon the scale 14. Attached rigidly to the sight-tube 12 is an open sight which consists of the front sight 15 and the rear sight 16. A knob 17 operates a worm 18 which meshes with a gear 19 and serves to adjust the angle of the sight.

The trunnions 13 are carried upon the frame 21 which is attached to the tube 22. The latter is supported in the gimbal-joint 23. This is shown in detail in Figure 3, and consists of the trunnions 26, ring 25, and trunnions 24. The latter are held in the mounting piece 27. This piece carries a cylindrical extension 28 which fits into the socket 29 of the mounting bracket 30. Mounting piece 27 has an extending arm 31 carrying a locating pin 32 which fits into a hole in bracket 30. Bracket 30 is mounted upon the aircraft or vehicle 33.

To the lower end of the tube 22 is attached the frame 40 which carries the stabilizing apparatus. Mounted in the frame 40 with axes mutually at right angles, are two cases 41 containing gyroscopes 43, both on normally vertical axes. To each of the cases are attached levers 45, which actuate pistons 46 in cylinders 47, by means of connecting rods 48. The pistons fit the cylinders quite closely, and the space above the piston is connected to the outside through a passage 49, the size of which may be varied by means of the valve 50.

Figure 7:
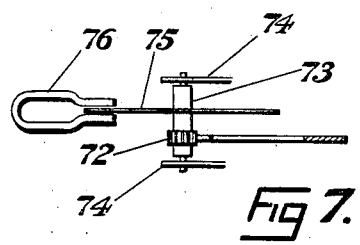
Figure 7 is a fragmentary view showing a magnetic type of damping mechanism.
Figure 8:
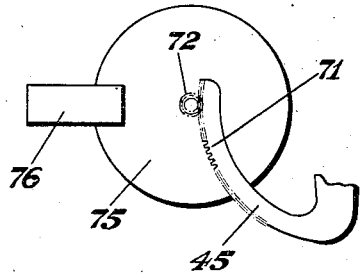
Figure 8 is an elevation of the mechanism shown in Figure 7.
Figure 4:
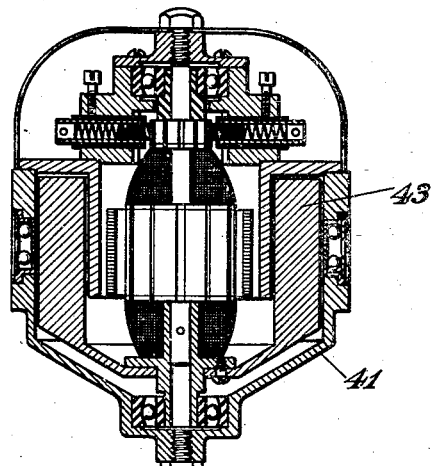
Figure 4 is a sectioned view of the gyroscopic unit. The section is taken as the line 4—4 of Figure 1.
Figure 5:
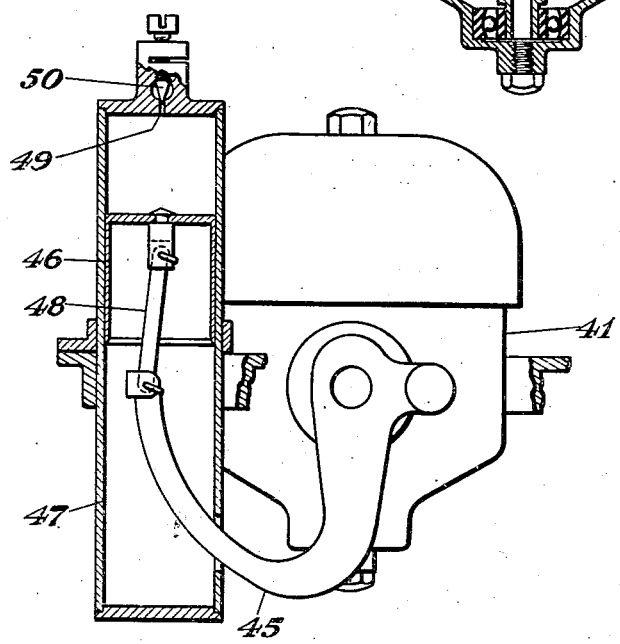
Figure 5 is a fragmentary side view of the dash-pot and gyroscopic unit, the dash-pot being shown in section.

Instead of the piston and cylinder type of damper, a magnetic damper may be employed as shown in Figures 7 and 8. Here the lever 45 has teeth 71 which engage a pinion 72 carried on a spindle 73. The latter is carried in the bearings 74 and has mounted on it a metal plate 75 which moves between the poles of a magnet 76.

The gyro cases 41 are held normally central (with the gyro axes vertical) by the springs 51, whose tension is adjustable by means of the screws 52.

Referring particularly to Figure 6, a stabilizer is shown applied to a camera 61. As in the bomb-sight stabilizer previously described, the stabilizer consists of two cases 41 containing gyroscopes. Here the gyroscopes both run on normally horizontal and mutually perpendicular axes. The cases are mounted for precession on vertical and mutually parallel axes. To each of the cases are attached levers 45 which actuate pistons 46 in cylinders 47 by means of connecting rods 48. The pistons fit the cylinders quite closely and the space above the piston is connected to the outside through a passage 49, the size of which may be varied by means of a valve 50. The gyro cases 41 are held normally central by the springs 51, whose tension is adjustable by means of the screws 52. The cases 41 are mounted on the camera 61 by means of brackets 62. The camera and stabilizer are pendulously supported on the gimbal ring 63 and bracket 64, which is mounted on the vehicle 65, a fragment of which is shown.

The gyroscopes are provided with means for driving. Electric motors are illustrated, see Figure 4, although any other suitable means, such as the impingement of an air-jet on the periphery of the wheel, may be employed.

The stabilizer, as described above, may be termed an internally damped gyroscopic pendulum. That is, it contains gyroscopes whereby the period of the pendulums may be adjusted and has damping means operated by the gyroscopes whereby the damping factor of the pendulum may be made great and still be independent of any mechanical connection to the craft on which the stabilizer is carried.

To understand the action of the stabilizer, first assume that the gyroscopes are not running. It is apparent that the entire apparatus will act as a simple pendulum supported from the center of the gimbal-joint. Its behavior can be predicted from a consideration of (a) Its enertia, and
(b) Its pendulous length.

Its period of oscillation cannot be made very long without making the size or the weight of the stabilizer unduly great. If disturbed, it will continue to oscillate with gradually decreased amplitude until it finally comes to rest. (The amplitude decrement is a function of the friction of the gimbal-joint.)

Now consider that the gyroscopes are running but that the dash-pots are disconnected from them. Any forces acting on the pendulum are now resisted by the precession of the gyroscopes, the effect being to lengthen the period of the pendulum. Disregarding the effect of friction about the precessional axes of the gyroscopes, the period would be infinitely great, if it were not for the action of the centralizing springs which tend to restrain the gyroscopes from moving their axes. By increasing or decreasing the strength of these springs, the period of the pendulum can be made short or long as desired. Thus, it is seen that when the gyros are running, the period of the pendulum is greater than when the gyros are not running, and may be varied at will. However, so long as the dash-pots are not connected with the gyros, the damping factor will be very low, as the only damping force is that due to the friction of the gyros about their precessional axes.

Now consider the operation of the system when the gyros are running with the dash-pots in operation. Assume that the pendulum is tilted slightly out of the vertical and released. At the time the pendulum is released, there is a certain amount of potential energy stored up which must be dissipated before the pendulum can come to rest. When the pendulum is released, it tends to return to the vertical, causing the gyros to precess and move the pistons in the dash-pot cylinders. Thus, the energy is dissipated in the work done by the dash-pot in pumping the air back and forth through the orifice in one end of the cylinder, and in the escape of the air past the piston. The damping factor may be varied by adjusting the size of the opening in the end of the cylinder, giving it any desired value. It is seen that this damping system is independent of the movements of the vehicle on which the stabilizer is mounted, and only comes into action when the angle of the pendulum changes.

It will be noted that the gyroscopes on the bomb-sight stabilizer shown in Figures 1 and 2 have their running axes vertical and normally parallel, and their precession axes horizontal and mutually perpendicular; and that the gyroscopes shown on the camera stabilizer in Figure 6 have their running axes horizontal and normally mutually perpendicular, and their precession axes vertical and parallel. Each of these arrangements is fundamentally equivalent to the other. In general terms the system may be described as follows: Two gyroscopes, each rotating about an axis, and each precessing about an axis at an angle to the rotational axis, one of such pairs of axes being normally vertical and parallel and the other pair of axes being normally horizontal and mutually perpendicular.

The explanation of the operation of the stabilizer will be found equally applicable to either arrangement.

As is well known to those versed in the art, a gyroscope does not act to resist forces tending to cause rotation about either its running axis or its precession axis. It is therefore necessary to employ two or more gyroscopes with either their running axes or their precession axes at an angle. I show two gyroscopes with axes at right angles, but more than two gyroscopes may be employed, with their axes at other angles.

As stated previously, and as is apparent from the above description, this stabilizer may be applied to any apparatus which is capable of being pendulously mounted.

Having thus disclosed and described my invention, what I claim as new and desire to protect by Letters Patent is:

1. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, energy absorbing means operatively disposed between said first means and said second means and between said third means and said fourth means, and a plurality of centralizing means one of such means operatively connected to said first means and said second means and another of such means operatively connected to said third means and said fourth means.

2. In combination, a support, a gyroscopic system pendulously mounted on said support, said system comprising: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, energy absorbing means operatively disposed between said first means and said second means and between said third means and said fourth means, and a plurality of centralizing means one of such means operatively connected to said first means and said second means and another of such means operatively connected to said third means and said fourth means.

3. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, energy absorbing means disposed between the gyroscopes and the second and fourth named means, and a plurality of centralizing means operatively connected to the gyroscopes and to the second and fourth named means, said energy absorbing means and said centralizing means being operable in response to the precession of said gyroscopes.

4. In combination with an object or apparatus to be stabilized, a stabilizer, means pendulously supporting said object or apparatus and said stabilizer, said stabilizer comprising: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, energy absorbing means operatively disposed between said first means and said second means and between said third means and said fourth means, and a plurality of centralizing means one of such means operatively connected to said first means and said second means and another of such means operatively connected to said third means and said fourth means.

5. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, a plurality of resilient means resisting the movement of the axes of rotation of said gyroscopes, one of said resilient means operatively connected to said first means and said second means and another of said resilient means operatively connected to said third means and said fourth means, and energy absorbing means operatively disposed between said first means and said second means and between said third means and said fourth means.

6. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, a plurality of resilient means resisting the movement of the axes of rotation of said gyroscopes one of said resilient means operatively connected to said first means and said second means and another of said resilient means operatively connected to said third means and said fourth means, means for varying the strength of said resilient means, and energy absorbing means operatively disposed between said first means and said second means and between said third means and said fourth means.

7. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, energy absorbing means operatively disposed between said first means and said second means and between said third means and said fourth means, means for varying the energy absorbing capacity of said energy absorbing means, and a plurality of centralizing means one of such means operatively connected to said first means and said second means and another of such means operatively connected to said third means and said fourth means.

8. A stabilizer, comprising in combination: a gyroscopic rotor, means supporting said rotor for rotation about an axis, means supporting said rotor for precession about an axis at an angle to said first named axis, a second gyroscopic rotor, means supporting said second named rotor for rotation about an axis, means supporting said second named rotor for precession about an axis at an angle to said third named axis, one of said two first named axes being normally parallel to the corresponding axis of said two last named axes, and the other two of said axes being normally at right angles to each other, a plurality of resilient means resisting the movement of the axes of rotation of said gyroscopes, one of said resilient means operatively connected to said first means and said second means and another of said resilient means operatively connected to said third means and said fourth means, means for varying the strength of said resilient means, energy absorbing means operatively disposed between said first means and said second means and between said third means and said fourth means, and means for varying the energy absorbing capacity of said energy absorbing means.

9. A stabilizer, comprising in combination, a plurality of gyroscopic rotors, each of said rotors having means supporting said rotor for rotation about an axis and means supporting said rotor for precession about a second axis at an angle to said first named axis, one of said axles of each rotor being normally parallel to the corresponding axis of each other rotor, and the other axes of said rotors being normally non-parallel to each other, energy absorbing means adapted to operate by the precession of said gyroscopes, and centralizing means operatively connected to said first means and said second means.

Signed at Brooklyn in the county of Kings and State of New York A. D. 1923.

MORRIS M. TITTERINGTON.